United States Patent [19]

Kawai et al.

[11] Patent Number: 4,981,897
[45] Date of Patent: Jan. 1, 1991

[54] AROMATIC POLYESTER FILM CONTAINING ORTHOPHOSPHATE POWDER

[75] Inventors: Hideki Kawai; Junji Takase; Kazuya Yonezawa, all of Hyogo, Japan

[73] Assignee: Kanegafuchi Kagaku Kogyo Kabushiki Kaisha, Osaka, Japan

[21] Appl. No.: 372,749

[22] Filed: Jun. 28, 1989

[51] Int. Cl.$^5$ .......................... C08G 63/02; C08J 3/10
[52] U.S. Cl. ................................... 524/414; 524/417; 528/193
[58] Field of Search ................. 524/414, 417; 528/193

[56] References Cited

U.S. PATENT DOCUMENTS

| | | | |
|---|---|---|---|
| 3,876,608 | 4/1975 | Anderson et al. | 260/40 |
| 3,884,990 | 5/1975 | Sakata et al. | 528/193 |
| 3,980,611 | 9/1976 | Anderson et al. | 260/40 |
| 4,102,864 | 7/1978 | Deex et al. | 528/193 |
| 4,123,420 | 10/1978 | Kyo et al. | 528/127 |
| 4,171,421 | 10/1979 | Buxbaum | 528/193 |
| 4,191,681 | 3/1980 | Stackman et al. | 528/193 |
| 4,390,682 | 6/1983 | Kyo et al. | 528/193 |
| 4,440,920 | 4/1984 | Fujikake et al. | 528/193 |

FOREIGN PATENT DOCUMENTS

61-62553  3/1986  Japan .
1359892  7/1974  United Kingdom .

OTHER PUBLICATIONS

Database WPIL abstract No. 197217, 1989, Derwent Publications; & JP-A-01 135 831 (Kanegafuchi Chem. K. K.) 29.05 1985 *the whole abstract*.
Patent Abstract of Japan vol. 8, No. 93 (C-220)(1530), Apr. 17, 1984, & JP-A-59 11 354 (Unitika K. K.) 20.01.1984 *the whole abstract*.

*Primary Examiner*—Harold D. Anderson
*Assistant Examiner*—T. Mosley
*Attorney, Agent, or Firm*—Armstrong, Nikaido, Marmelstein, Kubovcik & Murray

[57] ABSTRACT

An aromatic polyester film containing about 0.05 to 0.5% by weight, based on the weight of aromatic polyester resin, of a Group ITA alkaline earth metal orthophosphate powder composed mainly of particles having a particle diameter of about 1 to 10 μm.

7 Claims, No Drawings

AROMATIC POLYESTER FILM CONTAINING ORTHOPHOSPHATE POWDER

FIELD OF THE INVENTION

This invention relates to an aromatic polyester film and more particularly to an aromatic polyester film which has improved surface slipperiness, achieved by adding fine powder thereto, without detriment to optical characteristics.

BACKGROUND OF THE INVENTION

Aromatic polyester films have excellent optical characteristics with regard to transparency and optical isotropy. One characteristic which is important to the practical use of aromatic polyester films is the property of easy surface slipperiness, sometimes called the travelling property. Since good slipperiness between a film and its support (e.g., roll), or between adjacent films, are needed in the various stages of processing the films, operability and handleability in each stage can be improved and undesired failures, such as wrinkling of the films, can be prevented from occurring if surface slipperiness is improved.

In imparting easy slipperiness to general-purpose films, inert inorganic compounds (e.g., silica, clay, titania, etc.) or organic compounds (e.g., calcium terephthalate, or high-melting polyester when polyester films are to be treated) have been conventionally added and/or there have been used methods in which a large number of fine protrusions have been formed on the surfaces of the films by utilizing the residues of catalysts. Alternatively, films containing inert inorganic compounds added thereto have been monoaxially or biaxially oriented, under heating, to increase the number of the protrusions formed on the surfaces thereof or to control the heights of the protrusions. In these methods, increased slipperiness can also be imparted by reducing the coefficient of friction of the surfaces of the films. Reduction in the coefficient of friction of the surfaces of the films can be effectively accomplished by forming many surface protrusions which are high and large. When these methods are applied to aromatic polyester films, unfortunately, the turbidity of the films is increased, transparency is lowered and optical characteristics deteriorate.

The present inventors have studied such problems and found that there can be obtained an aromatic polyester film having improved surface slipperiness property without detrimentally affecting the optical characteristics thereof. The present invention is based on this finding.

SUMMARY OF THE INVENTION

It is an object of the present invention to provide an aromatic polyester film having improved surface slipperiness property without detriment to optical characteristics.

The present invention provides an aromatic polyester film containing 0.05 to 0.5% by weight (based on the amount of aromatic polyester) of a Group IIA alkaline earth metal orthophosphate substantially uniformly dispersed therein, said alkaline earth metal phosphate having a critically controlled particle size, being mainly composed of particles having particle diameters of about 1 to 10 μm.

DETAILED DESCRIPTION OF THE INVENTION

The present invention will be illustrated in more detail below.

Aromatic polyesters useful in the present invention include those obtained by polymerizing terephthalic acid, isophthalic acid, or a mixture of terephthalic acid and isophthalic acid, with a mixture of an alkyl-substituted dihydric alcohol represented by the following formula (I)

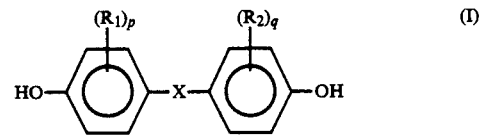

(wherein $R_1$ and $R_2$ each represent the same or different alkyl group having from 1 to 4 carbon atoms; p and q each represent an integer of from 1 to 4; X represents a direct bond, an alkylene group having from 1 to 10 carbon atoms, an alkylidene group having from 2 to 20 carbon atoms, —O—, —S—, —SO—, —SO$_2$—

and hydrogen atoms of said alkyl group and said alkylidene group may be optionally substituted by one or more hydrocarbon groups having from 1 to 20 carbon atoms, halogen atoms and halogenated hydrocarbon groups), and a dihydric phenol represented by the following formula (II)

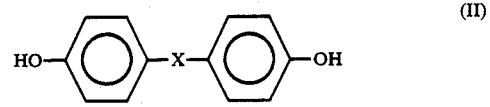

(wherein X is as defined above) in a molar ratio of (I) to (II) of from 1/9 to 9/1.

It is preferred that the aromatic dicarboxylic acid component be reacted in the form of terephthalic acid chloride and isophthalic acid chloride in a molar ratio of from 9/1 to 5/5 when the aromatic polyesters hereof are to be molded into films by means of solution casting. When the amount of terephthalic acid component is outside the range defined above, the organic solvent solutions of the resulting polymers are poor in stability and the light transmittance of films cast therefrom is reduced.

As the dihydric phenol component, it is preferred that an alkali metal salt of at least one bisphenol having the following formula (I)

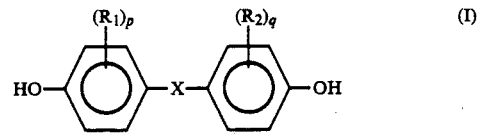

(Wherein $R_1$, $R_2$, p, q and X are as defined above) is used in admixture with an alkali metal salt of at least one bisphenol having the following formula (II)

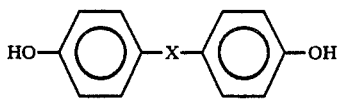

(wherein X is as defined above) in a molar ratio of from 1/9 to 9/1 in the presence of a phase transfer catalyst. When the molar ratio of (I)/(II) exceeds the range defined above, the stability of the organic solvent solutions of the resulting polymers is poor and the light transmittance of the resulting film is lowered. The total number of mols of the dihydric phenols to be used should be substantially equal to the total number of mols of the bifunctional aromatic dicarboxylic acid chlorides.

The viscosity, $\eta_{sp}/C$, of the product aromatic polyester resins to be used is in the range of preferably about 0.4 to 2.0 (when 0.32 g of polymer is dissolved in 1 dl of chloroform and the viscosity is measured at 32° C.). When the viscosity, $\eta_{sp}/C$, is lower than the above lower limit, the resulting film is insufficient with regard to strength, while when the viscosity is higher than the above upper limit, the organic solvent solutions from which the film is cast are too viscous and workability in the preparation of the film becomes poor.

The degree of polymerization can be controlled by using the dihydric phenols in combination with about 1 to 10 mol % of a monofunctional phenol such as phenol, cresol, xylenol, nonylphenol, butylphenol, methoxyphenol or phenylphenol. Alternatively, the degree of polymerization can be controlled by using the aromatic dicarboxylic acids or their anhydrides or acid chlorides in combination with about 1 to 10 mol % of a monofunctional acid halide such as benzoyl chloride.

Examples of the dihydric phenols having the formula (I) which can be used in the present invention include 2,2-bis(3,5-dimethyl-4-hydroxyphenyl)propane, 2,2-bis(3,5-di-sec-butyl-4-hydroxyphenyl)propane, 2,2-bis(3,5-di-tert-butyl-4-hydroxyphenyl)propane, bis(3,5-dimethyl-4-hydroxyphenyl)methane, 1,1-bis(3,5-dimethyl-4-hydroxyphenyl)ethane, 1,1-bis(3,5-dimethyl-4-hydroxyphenyl)cyclohexane, bis(3,5-dimethyl-4-hydroxyphenyl)-sulfone, bis(3,5-dimethyl-4-hydroxyphenyl)ketone, bis-(3,5-dimethyl-4-hydroxyphenyl)ether, bis(3,5-dimethyl-4-hydroxyphenyl)sulfide, 2,2-bis(3,5-dimethoxy-4hydroxyphenyl)hexafluoropropane, 2,2-bis(3,5-dimethoxy-4-hydroxyphenyl)propane, bis(3,5-dimethoxy-4-hydroxyphenyl)methane, 2,2-bis(3-methyl-4-hydroxy-5-methylphenyl)propane, bis(3-methyl-4-hydroxy-5-methylphenyl)methane, bis(3,5-diphenoxy-4-hydroxyphenyl)methane, 2,2-bis(3,5-diphenoxy-4-hydroxyphenyl)propane, bis(3-phenoxy-4-hydroxy-5-methyl)methane, 4,4′-dihydroxy-3,3′,5,5′-tetramethylbiphenyl and 4,4′-dihydroxy-3,3′, 5,5′-tetraethylbiphenyl.

Examples of the dihydric phenols having the formula (II) include bis(4-hydroxyphenyl)methane, 1,1bis(4-hydroxyphenyl)ethane, 2,2-bis(4-hydroxyphenyl)propane, bis(4-hydroxyphenyl)sulfone, bis(4-hydroxyphenyl)ketone, 4,4′-dihydroxyphenyl ether and 4,4′-dihydroxydiphenyl sulfide.

If desired, condensed polycyclic bisphenols such as dihydroxynaphthalene and dihydroxyanthracene; bisphenol dyes such as alizarins, phenolphthalein, fluorescein, naphthophthalein, thymolphthalein, aurin, phenolsulfophthalein and dibromophenolsulfophthalein; and dinaphthyl compounds such as 2,2′-dihydroxy-1,1′-dinaphthylmethane, 4,4′-dihydroxydinaphthyl-1, 2,2′-dihydroxydinaphthyl-1,1′, 1,1′-bis(4-hydroxynaphthyl)-2,2,2-trichloroethane, 2,2′-di-hydroxydinaphthylphenylmethane may be used as part of the bisphenols.

Inorganic compounds (e.g., silica, clay, titania etc.) and organic compounds (e.g., calcium terephthalate, etc.) have been used as fine powder with the polyesters of the present invention to form many fine protrusions on the surface of the film and to thereby improve surface slip properties. However, such films are not considered to be fully satisfactory with respect to transparency. The present inventors have made studies and found that when the orthophosphate compounds of alkaline earth metals (Be, Mg, Ca, Sr and Ra) of Group IIA of the Periodic Table are used, the surface slip properties of the aromatic polyester film can be improved without detriment to transparency. Further, it has been found that when calcium hydrogen phosphate ($CaHPO_4$) or calcium pyrophosphate ($Ca_2P_2O_7$) is used as the Group IIA alkaline earth metal orthophosphate compound powder, the powder can be uniformly well-dispersed in the aromatic polyester film and a preferred product is produced.

Fine powder for use in forming protrusions on the surface of the film is mainly composed of particles having a particle diameter of about 1 to 10 $\mu$m. When the particle diameter is within the range of from 1 to 10 $\mu$m, the amount of the fine powder to be added can be arbitrarily controlled to thereby allow the formation of the protrusions on the surface of the film to be carefully controlled without reducing the mechanical properties of the aromatic polyester film. When particles having particle diameters of larger than about 10 $\mu$m are used, such large size particles can physically damage the film and can lower the mechanical strength of the film, though protrusions can be formed on the surface thereof. On the other hand, when particles having particle diameters of smaller than about 1 $\mu$m are used, protrusions are not formed and the surface slipperiness of the film is not improved, even though the mechanical properties of the film are little affected. Further, when fine powder composed of a large amount of particles having particle diameters of smaller than about 1 $\mu$m, is used, the amount of the powder to be added is unnecessarily increased.

According to the present invention, there can be obtained an aromatic polyester film having excellent surface slipperiness without causing much change in the basic properties of the film when the amount of the fine powder added to the film is in the range of about 0.05 to 0.5% by weight based on the weight of resin in the film. When the amount of the fine powder is less than 0.05% by weight, based on the weight of the resin, the number of fine protrusions formed on the surface of the film is small and the surface slipperiness of the film is not sufficiently improved. When the amount of particles is more than 0.5% by weight, the transparency of the film deteriorates, though it is possible to improve surface slipperiness.

The present invention is now illustrated in greater detail by reference to the following examples which, however, are not to be construed as limiting the present invention in any way.

Comparative Example 1

A dope, comprising a 1,1,2,2-tetrachloroethane solution (15 wt %) of an aromatic polyester composed of terephthalic acid/isophthalic acid (molar ratio of 9/1)

and bisphenol A/3,3',5,5'-tetramethylbisphenol F (molar ratio of 2/1), was prepared. The dope was cast on a glass plate and heated on a hot plate (50° C. for 20 minutes, 100° C. for 20 minutes, 150° C. for 20 minutes) to remove the solvent. The resulting film was peeled off the glass plate, fixed on all sides by means of a tool, and thermally treated at 250° C. for 10 minutes to obtain a film of about 100 μm in thickness. The characteristics of the film are shown in Table 1.

thoroughly stirred. There was obtained an aromatic polyester film of about 100 μm in thickness. The characteristics of the film are shown in Table 1.

TABLE 1

|  | Amount of inorg. powder (wt %) | Average particle diameter *1 (μm) | Viscosity distribution *1 (μm) | Tensile strength (kg/cm$^2$) | Elongation (%) | Coefficient of dynamic friction *2 (Uk) | Haze (%) | Light transmittance (%) |
| --- | --- | --- | --- | --- | --- | --- | --- | --- |
| Comp. Ex. 1 | 0 |  |  | 800 | 30 | >0.9 | 0.5 | 90 |
| Comp. Ex. 2 | CaHPO$_4$: 0.2 | 12.0 | 0.1 to 25 | 530 | 10 | 0.44 | 0.5 | 90 |
| Comp. Ex. 3 | CaHPO$_4$: 0.5 | 2.5 | 1 to 5 | 750 | 25 | 0.43 | 1.0 | 90 |
| Comp. Ex. 4 | CaHPO$_4$: 0.7 | 2.5 | 1 to 5 | 610 | 15 | 0.41 | 1.5 | 90 |
| Comp. Ex. 5 | Ca$_2$P$_2$O$_7$: 0.7 | 2.5 | 1 to 5 | 600 | 16 | 0.39 | 0.5 | 90 |
| Comp. Ex. 6 | Silica: 0.2 | 2.5 | 1 to 5 | 780 | 25 | 0.42 | 10.0 | 90 |
| Ex. 1 | CaHPO$_4$: 0.2 | 2.5 | 1 to 5 | 790 | 28 | 0.46 | 0.5 | 90 |
| Ex. 2 | Ca$_2$P$_2$P$_7$: 0.2 | 2.5 | 1 to 5 | 805 | 29 | 0.46 | 0.5 | 90 |

*1 Coultar counter method
*2 ASTM D-1894-63

Examples 1 and 2

0.2% by weight (based on the weight of the resin of the film) of anhydrous calcium hydrogen phosphate (CaHPO$_4$) or calcium pyrophosphate (Ca$_2$P$_2$O$_7$) powder having an average particle diameter of 2.5 μm was added to the dope prepared in Comparative Example 1. Particles having a particle diameter of smaller than 1 μm and particles having a particle diameter of larger than 10 μm were not used. The mixture was thoroughly stirred to disperse the powder. In the same way as in Comparative Example 1, an aromatic polyester film of about 100 μm in thickness was obtained. The characteristics of the film are shown in Table 1.

Comparative Example 2

0.2% by weight (based on the weight of the resin of the film) of anhydrous calcium hydrogen phosphate (CaHPO$_4$) having a particle diameter of 12.0 μm and a particle size distribution of 0.1 to 25 μm was added to the dope of the aromatic polyester prapared in Comparative Example 1. The mixture was thoroughly stirred to disperse the powder. In the same way as in Comparative Example 1, an aromatic polyester film of about 100 μm in thickness was obtained. The characteristics of the film are shown in Table 1.

Comparative Examples 3 to 5

The procedure of Comparative Example 1 was repeated except that 0.5% or 0.7% by weight of the powders used in Example 1 and 0.7% by weight of the powders used in Example 2 was added respectively to the dope of the aromatic polyester of Comparative Example 1. There was obtained an aromatic polyester film of about 100 μm in thickness. The characteristics of the film are shown in Table 1.

Comparative Example 6

The procedure of Comparative Example 1 was repeated except that 0.2% by weight (based on the weight of the resin) of silica having an average particle diameter of 2.5 μm and a particle size distribution of 1 5 μm was added to the dope of the aromatic polyester prepared in Comparative Example 1 and the mixture was thoroughly stirred. There was obtained an aromatic polyester film of about 100 μm in thickness. The characteristics of the film are shown in Table 1.

While the invention has been described in detail and with reference to specific embodiments thereof, it will be apparent to one skilled in the art that various changes and modifications can be made therein without departing from the spirit and scope thereof.

What is claimed is:

1. An aromatic polyester film containing (a) an aromatic polyester resin obtained by polymerizing terephthalic acid, isophthalic acid or a mixture of terephthalic acid and isophthalic acid with a mixture of an alkyl-substituted dihydric phenol represented by formula (I)

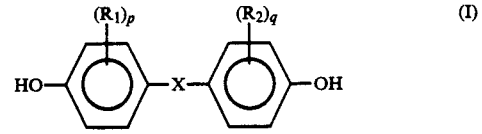

wherein $R_1$ and $R_2$ each represent the same or different alkyl groups having from 1 to 4 carbon atoms; p and q each represent the same or different integer of from 1 to 4; X represents a direct bond or X represents an alkylene group having from 1 to 10 carbon atoms, an alkylidene group having from 2 to 20 carbon atoms, —O—, —S—, —SO—, —SO$_2$— or

wherein hydrogen atoms of said alkyl group and said alkylidene group are optionally substituted by one or more hydrocarbon groups having from 1 to 20 carbon atoms, halogen atoms and halogenated hydrocarbon groups and a dihydric phenol represented by formula (II)

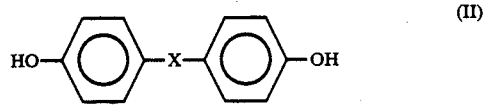

wherein X is as defined above, in a molar ratio of (I) to (II) of from 1/9 to 9/1 and (b) 0.05–0.5% by weight, based on the weight of aromatic polyester resin, of a group IIA alkaline earth metal orthophosphate powder composed substantially of particles having a particle diameter of about 1-10 μm.

2. An aromatic polyester film as claimed in claim 1, wherein the acid component consists of terephthalic acid and isophthalic acid in a molar ratio of terephthalic acid to isophthalic acid of from 9/1 to 5/5.

3. An aromatic polyester film as claimed in claim 1, wherein the alkyl-substituted dihydric phenol is a compound represented by the following general formula

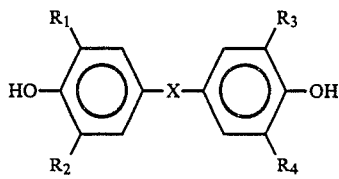

wherein $R^1$, $R^2$, $R^3$ and $R^4$ are the same or different groups and each is an alkyl group having from 1 to 4 carbon atoms.

4. An aromatic polyester film as claimed in claim 1, wherein said aromatic polyester resin has a viscosity $\eta_{sp}/C$ (0.32 g/dl of solvent) of about 0.4 to 2.0 when measured in chloroform at 32° C.

5. An aromatic polyester film as claimed in claim 1, wherein the Group IIA alkaline earth metal orthophosphate is anhydrous calcium hydrogen phosphate ($CaHPO_4$).

6. An aromatic polyester film as claimed in claim 5, wherein the Group IIA alkaline earth metal orthophosphate is calcium phyrophosphate ($Ca_2P_2O_7$).

7. An aromatic polyester film as claimed in claim 1, wherein said aromatic polyester resin has a viscosity $\eta_{sp}/C$ (0.32 g/dl of solvent) of about 0.4 to 2.0 when measured in chloroform at a temperature of 32° C.

* * * * *